United States Patent [19]

O'Hair

[11] Patent Number: 5,187,789
[45] Date of Patent: Feb. 16, 1993

[54] GRAPHICAL DISPLAY OF COMPILER-GENERATED INTERMEDIATE DATABASE REPRESENTATION

[75] Inventor: Kelly T. O'Hair, Livermore, Calif.

[73] Assignee: Supercomputer Systems Limited Partnership, Eau Claire, Wis.

[21] Appl. No.: 640,909

[22] Filed: Jan. 11, 1991

Related U.S. Application Data

[63] Continuation-in-part of Ser. No. 537,466, Jun. 11, 1990.

[51] Int. Cl.$^5$ .............................. G06F 9/06; G06F 3/14
[52] U.S. Cl. .............................. 395/700; 364/DIG. 1; 364/280.4; 364/237.3
[58] Field of Search ... 364/200 MS File, 900 MS File; 395/700

[56] References Cited

U.S. PATENT DOCUMENTS

| | | | |
|---|---|---|---|
| 4,437,184 | 3/1984 | Cork et al. | 364/200 |
| 4,621,319 | 11/1986 | Braun et al. | 364/200 |
| 4,667,290 | 5/1987 | Goss et al. | 364/DIG. 1 |
| 4,742,467 | 5/1988 | Messerich et al. | 364/200 |
| 4,831,580 | 5/1989 | Yamada | 364/900 |
| 4,835,709 | 5/1989 | Tsai | 364/900 |

Primary Examiner—Thomas M. Heckler
Attorney, Agent, or Firm—Earl C. Hancock

[57] ABSTRACT

The graphical display of compiler intermediate database representation is produced to function as an aid in the development of highly optimizing compilers, the inspection of the compiler-generated intermediate representation, and the analysis of the effects of a highly optimizing compiler upon original source code. This method extracts the intermediate representation and transforms it into simultaneous displays of the program statements, expressions, basic blocks, machine instructions, and original source code for a particular source position, statement, expression, basic block, or machine instruction.

16 Claims, 12 Drawing Sheets

STATEMENT NODE 4

| | |
|---|---|
| ST_OP_(NODE) | = 20 (SOPRETURN) |
| ST_SFA_(NODE) | = (OFFSET=51, LINE=9, FILE="EXAMPLE2.C") |
| ST_PREVIOUS_(NODE) | = STATEMENT 8 |
| ST_NEXT_(NODE) | = STATEMENT 6 |
| ST_BLOCK_(NODE) | = BLOCK 3 |
| ST_LF_START_(NODE) | = LOFORM 21 |
| ST_LF_END_(NODE) | = LOFORM 18 |
| ST_INLINING_ROOT_(NODE) | = NULL_NODE |
| ST_WELL_STRUCTURED_(NODE) | = 0 |
| ST_HAS_CALL_(NODE) | = 0 |
| ST_INLINED_(NODE) | = 0 |
| ST_ORDINAL_(NODE) | = 4 |
| ST_IS_SCALAR_(NODE) | = 0 |
| ST_RETURN_EXPR_(NODE) | = EXPRESSION 19 |

FIGURE 5A

EXPRESSION NODE 6

| | |
|---|---|
| EX_OP_(NODE) | = 38 (EOPRVAL) |
| EX_DATA_TYPE_(NODE) | = TYPE 11 |
| EX_PARENT_(NODE) | = STATEMENT 4 |
| EX_SRC_OFFSET_(NODE) | = 35 |
| EX_INDEGREE_(NODE) | = 3 |
| EX_USE_COUNT_(NODE) | = 3 |
| EX_HASH_(NODE) | = 0 |
| EX_ADDR_KIND_(NODE) | = 0 (UNDEF ADDR) |
| EX_RANK_(NODE) | = 0 |
| EX_LF_GENERATED_(NODE) | = 1 |
| EX_FORTRAN_ASSIGN_(NODE) | = 0 |
| EX_CALL_INLINE_(NODE) | = 0 |
| EX_CALL_IN_LOOP_(NODE) | = 0 |
| EX_CALL_WONT_RETURN_(NODE) | = 0 |
| EX_VISITED_(NODE) | = 0 |
| EX_INVARIANT_(NODE) | = 0 |
| EX_IV_DEF_(NODE) | = 0 |
| EX_IF_NO_CE_(NODE) | = 0 |
| EX_DONT_SPLIT_(NODE) | = 0 |
| EX_SCALAR_STATUS_(NODE) | = 0 |

FIGURE 5B

BLOCK NODE 3
BLK_FIRST_STMT_(NODE)            = STATEMENT 2
BLK_LAS_STMT_(NODE)              = STATEMENT 4
BLK_PREVIOUS_(NODE)              = BLOCK 1
BLK_NEXT_(NODE)                  = BLOCK 2
BLK_SIBLING_(NODE)               = NULL_NODE
BLK_GUARD_(NODE)                 = NULL_NODE
BLK_PARENT_(NODE)                = LOOP 1
BLK_DFN_(NODE)                   = 2
BLK_NEST_(NODE).INDEX            = 0
BLK_NEXT_(NODE).DEPTH            = 0
BLK_ORDINAL_(NODE)               = 1
BLK_CONNECTED_(NODE)             = 1
BLK_VISITED_(NODE)               = 0
BLK_HAS_CALL_(NODE)              = 0
BLK_HAS_UNKNOWN_CALL_(NODE)      = 0
BLK_HAS_IND_REFS_(NODE)          = 0
BLK_IS_LOOP_EXIT_(NODE)          = 0
BLK_IS_LOOP_HEAD_(NODE)          = 0
BLK_IS_LOOP_TAIL_(NODE)          = 0
BLK_IS_LOOP_EPILOGUE_(NODE)      = 0

FIGURE 5C

LOFORM NODE 14
LF_OP_(NODE)                = 63 (I_MOVE_8)
LF_OPND_KIND_(NODE)         = 0
LF_OPND1_(NODE)             = REGISTER 13
LF_OPND2_(NODE)             = NULL_NODE
LF_OPND3_(NODE)             = CONSTANT 5
LF_OPND4_(NODE)             = NULL_NODE
LF_USE_COUNT_(NODE)         = 1
LF_NEXT_(NODE)              = LOFORM 20
LF_HF_(NODE)                = EXPRESSION 7
LF_RDG_(NODE)               = 3
LF_OFFSET_WORD_(NODE)       = 1
LF_OFFSET_PARCEL_(NODE)     = 1
LF_BIN_ADDRESS_(NODE)       = 3

FIGURE 5D

GRAPHICAL DISPLAY OF COMPILER-GENERATED INTERMEDIATE DATABASE REPRESENTATION

RELATED APPLICATIONS

This application is a continuation-in-part of an application filed in the United States Patent and Trademark Office on Jun. 11, 1990, entitled INTEGRATED SOFTWARE ARCHITECTURE FOR A HIGHLY PARALLEL MULTIPROCESSOR SYSTEM, U.S. Ser. No. 07/537,466, and assigned to the assignee of the present invention, the disclosure of which is hereby incorporated by reference in the present application. The application is also related to co-pending application, entitled AN INTEGRATED HIERARCHICAL REPRESENTATION OF COMPUTER PROGRAMS FOR A SOFTWARE DEVELOPMENT SYSTEM, U.S. Ser. No. 07/572,043, filed on Aug. 23, 1990, which is assigned to the assignee of the present invention, the disclosure of which is hereby incorporated by reference in the present application.

TECHNICAL FIELD

This invention relates generally to the field of high-level language compilers. More particularly, the present invention relates to the graphical display of the intermediate database representation of languages generated by such compilers.

BACKGROUND ART

Many optimizing compilers, those that perform detailed analysis of the source code and use the information to generate the more efficient machine code, generate an intermediate database representation of the high-level language programs and use this intermediate database representation within their various compilation and optimization processes. At the end of the compilation process, the intermediate database representation is transformed into machine-executable code used by the processors.

Information contained in a compiler-generated intermediate representation can include expression trees, expression directed acyclic graphs (DAGs), symbols, literals, statements, statement chains, pointers to original source code, and a wide range of optimization elements such as basic blocks, loop constructs, dependence information, register allocation information, and pointers to the machine code output. An "expression" is represented as an operator and some number of child expressions. A "tree" shows that every child expression under a root has one (1) parent. A DAG is similar to a tree, including parents and children but with a DAG, a child expression can have any number of parents. Most if not all of the elements for a typical intermediate representation including a detailed discussion of DAGs are contained in a book by Aho, Sethi, and Ullman, *Compilers Principles, Techniques and Tools*, Addison-Wessley (1986).

This type of detailed and specific information contained in compilergenerated intermediate representation is required in a variety of compiler development and programming tasks. The usual prior method of access to this detailed and specific information has been through the use of simple text dumps. Because text dumps contain all of the information available, they are typically bulky and are cumbersome and time-consuming when utilized. Furthermore, text dumps are complete printouts of the large database constituting the intermediate information. It is not a tool that allows the user to browse through the intermediate information with graphical displays as is realized by the present invention.

Another prior art method of access was developed by the inventor hereof at Lawrence Livermore National Laboratory (LLNL) called DAGTOOL, which is limited to creating expression trees. It was developed on the LLNL Television Monitor Display System, a non-interactive video display system which drew expression DAGs by typing in the expression index. It was not a window based tool, nor was it mouse driven. It read an ASCII dump of the intermediate, not the true intermediate, so neither source, nor other elements of the intermediate were displayed. No known prior art exists that completely displays for evaluation any compiler intermediate language.

In the past, testing and analytical work associated with the development of compilers, optimization techniques, code parallelization and debugging has relied on text dumps and other sources that provide limited and/or undifferentiated information. Sophisticated, visual and flexible tools are required to support such technically acute and exacting development, analysis, and testing activity.

SUMMARY OF THE INVENTION

The present invention is a new graphical display tool for use in the analysis of intermediate database representations generated by certain high-level language compilers. While not necessarily so limited, the preferred embodiment of the present invention is described below as implemented to reflect and display the table-driven intermediate database representation in an environment described in the co-pending application, AN INTEGRATED HIERARCHICAL REPRESENTATION OF COMPUTER PROGRAMS FOR A SOFTWARE DEVELOPMENT SYSTEM, 07/572,043. The front end of one version of a high level language compiler parses the source code and generates a structured model of the program called Intermediate Hierarchical Representation (IHR). IHR comes in two flavors, Hi/Form (HF) and Lo/Form (LF). What the compiler front end produces is entirely HF, and it is the HF that embodies the structure of the program. In a later stage of compilation, the code generator produces LF, which is close to machine language, and attaches it to the HF. The present invention (portions of which are sometimes hereinafter referred to as "Nodestool") operates mainly on HF, but it can look at the complete IHR with the HF and LF together. The name Nodestool is derived from the fact the HF contains nodes and the present invention is a tool to display those nodes.

HF is made up of nodes representing semantic elements of the high level program. These nodes contain references to certain broad classes of information about semantic items and data objects by way of indices into tables. The use of table-references instead of pointers for this purpose takes advantage of a highly pipelined vector computer architecture, and it allows greater flexibility in moving a table in memory or storing it in secondary memory.

The HF representation of programs produced by the compiler front-ends and the assembler is used by the optimizer, inliner, assembler, code generator, and debugger as well as the graphical compiler development utility, Nodestool. Its nodal, table-oriented structure efficiently stores the information needed for debugging: source to binary mappings, register usage, and other information needed to debug highly optimized code.

A portion of HF called LF, is a graph-structured representation of the machine instructions generated for a program. This graph structure allows several machine dependent optimizations to be performed at the machine code level.

The benefits of the present invention include its ability to present related pieces of information, to show how the displayed information is hiearchically ordered, and to provide textual information for many low-level elements. This tool presents to the compiler writer the intermediate and allows them to view and browse through the intermediate in the manner of a compiler writer. In so doing, the invention operates in a "read-only" mode with respect to the intermediate.

The compiler-generated intermediate representation consists of expression trees, expression dags, symbols, literals, statements, statement chains, pointers to the original source code, and various other optimization elements such as basic blocks, loop constructs, dependence information, register allocation information, and pointers to the machine code output. These various pieces are generally tied together within the intermediate representation through connections. A table-driven intermediate uses indices instead of connections which facilitates the ability of the compiler and the tool in reading and/or writing the intermediate. The present invention uses these connections and indices to collect and organize information requested by the user.

For example, an expression node has a connection to the parent statement node that uses this expression. The statement node has a connection to the root expression node that contains this expression node. The statement node also has a connection to a block node which represents a series of statement nodes, all of which are connected together in a chain. The block node has a connection to the first and last statement node for the block, and also to the next block node in the control flow. The original expression node also has a connection to the Lo/Form (LF) node representing the first machine instruction associated with this expression. This LF node has connections to all the following LF nodes along with a connection back to the expression node. Returning to the statement node results in a connection to the LF nodes generated for that statement.

An advantage of the present invention is that it can select out and present a set of related pieces of information or all the parts of the intermediate (nodes in HF) that relate to the selected node (i.e., have a connection to or from it). Connections are the means used to collect and to display a set of related pieces at the same time. When a particular statement node, expression node, block node or whatever node is requested, by using the connections, all other nodes that are associated with the selected nodes are highlighted. The user needs to request only one of the nodes because the connections (contained in the intermediate) are used to find all other "related" nodes so that the display can accurately display not only the node selected by the user, but all the nodes that have connections to or from the selected node. Pieces of information related to a single program statement, for example, are shown in a single window. These pieces include the statement itself, its location in source code, its inclusion in a basic block (if applicable), the machine instructions generated for the statement, and the expression tree and directed acyclical graph that the statement represents. These pieces are shown in the same form they take in the intermediate representation, including HF and LF representation.

Each of the various pieces of the intermediate representation also have textual information associated with them. For example, textual information for any given displayed expression node can be seen by bringing up a small window containing text describing the contents of every field of the expression node.

An advantage of a visually based tool is the ability to display the parent and child relationships, the tree or DAG display along with the connections that form simple chains. This capability enables the statement described in the preceding example to be shown in its relationship to other statements within the program. In addition, the expression tree contained within the statement is shown.

Another advantage of a visually-based tool is the presentation of clearly drawn information as needed. The present invention shows expression trees and DAGs drawn as users would draw such trees and directed acyclical graphics. The conversion process that Nodestool goes through is to walk through the intermediate expression tree once, to find out how big each branch of the tree is; then to walk the tree again using the knowledge in laying out the drawing. The tree spreads out as the various branches get bigger and bigger. DAGs are not drawn any different than trees, except that the branches that are DAGs are highlighted for easy recognition. Statement chains are clearly presented as chains.

An additional advantage of the present invention is the ease with which users can specify and select information. Information is presented in windows and in sub-windows called panes that organize the information for the user. Icons and control buttons enable the user to easily move up and down in the information hierarchy, to scroll where necessary, to browse, and to move to new information by selecting an element's icon. Specific information is readily available to the user in an organized fashion without lengthy and repetitious examinations of a cryptic text dump. Further, the present invention provides user controls such that the user can invoke utilities from the tool itself to print, read, dump, close, quit and so forth.

These and other objectives of the present invention will become apparent with reference to the drawings, the detailed descriptions of the preferred embodiment, and the appended claims. Those having normal skill in the art will recognize the foregoing and other objects, features, advantages and applications of the present invention from the following more detailed description of the preferred embodiments as illustrated in the accompanying drawings.

DESCRIPTION OF THE DRAWINGS

FIG. 5A illustrates a user view of a textual listing for a source statement after the user has selected the appropriate icon to view textual information about a program statement.

FIG. 5B illustrates a user view of textual listings for an expression tree after user selection of an expression node.

FIG. 5C is one type of display of an expression tree resulting from user selection of block node 3.

FIG. 5D is a typical expression tree display resulting from user selection of a machine instruction node.

APPENDIX

Appendix A contains the manpage for an example of an implementation of the present invention which is called Nodestool. The term "manpage" is an abbreviation of "manual page" and refers to a short document describing how to use a software utility.

DESCRIPTION OF THE PREFERRED EMBODIMENT

Figure 1:
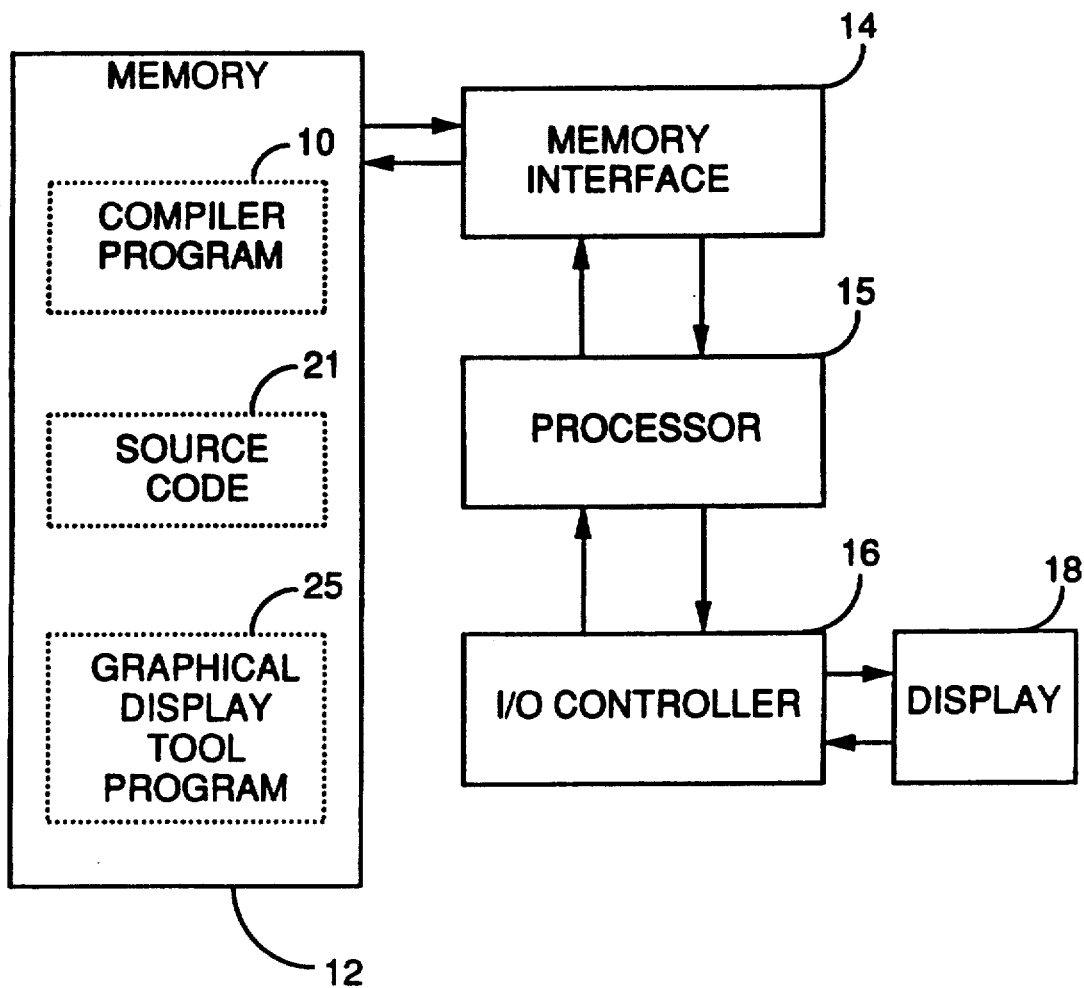
FIG. 1 is a block diagram of a system environment showing the general relationship of the present components useful in implementing the invention.

FIG. 1 is a typical machine environment suitable for implementing the preferred embodiment of the present invention. This invention is usable in other machine configurations including a stand-alone processor with dedicated storage. FIG. 1 as shown, however, generally sets forth the operative elements of a clustered multi-processor system as utilized to advantageously employ this invention. This includes memory storage 12 assigned to cooperate with processor 15 via memory interface 14. Processor 15 responds to user originated signals introduced thereto as commands to extract relevant information of a set selected by the user for delivery through I/O controller 16 into the user observed display 18.

Memory 12 has resident therein a compiler program 10 which responds to introduction of source code 21 to establish a machine code program. In so doing, it creates a myriad of intermediate representations which are likewise retained in memory 12 in an area not shown. Whenever the user desires to inspect the state of the compiled program, the graphical display tool program 25 is actuated by the user also by means not shown. The user might decide to do this, for instance, in order to perform an analysis of some portion of the program or to debug the program.

The intermediate representations associated with the machine program established by the compiler program 10 typically includes connections to tie the various pieces together as is also true of indices for table-driven intermediate representations. The graphical display tool program 25 uses these connections and indices to collect and organize the information sets requested by the user. Broadly it does this by bringing in the memory image of the intermediate representation generated by the compiler program directly into the memory of the graphical display tool program. The graphical display tool now can access the intermediate representation exactly as it was referenced and built by the compiler program.

The graphical display tool program 25 uses the connections contained in the intermediate representation established by the compiler program 10. It is based on a selection of one particular item by the user where it displays the intermediate in graphical form. This selection by the user may be a source code 21 line number or byte offset, or a particular element of the intermediate representation. The compiler program 10 had previously established all the connections necessary for the graphical tool to locate all the related elements in the intermediate representation. Program 25 will then compose a visible display of an element selected by the user to the extent reasonably usable on the screen of display 18 including everything associated with the selected item.

The present invention utilizes the dual forms (HF and LF) of the intermediate representation generated by the compilation environment of the preferred environment. The present invention could also be implemented with a compilation system that uses a single-level intermediate representation, as well as with a compilation system that generates multiple-level representation. The preferred embodiment is based on an intermediate database representation that is easily written out from memory and read back in by the graphical tool program. The implementation of the preferred embodiment herein described uses a window-based graphics system well suited for use in conjunction with a mouse to provide the capabilities required for the graphical tool. The compiler can then save that intermediate inside the resulting object file that maps to the original source file. Most compilers generate only machine code (plus some symbol table information) into their object files. The present invention places the intermediate into the object files along with the machine code and symbol table information. Nodestool then operates on those object files containing HF, i.e., it reads back in (into memory) the intermediate that was saved by the compiler in the object file. Nodestool does not generate the intermediate to look at, the compilers do. Nodestool only views the intermediate.

Figure 2:
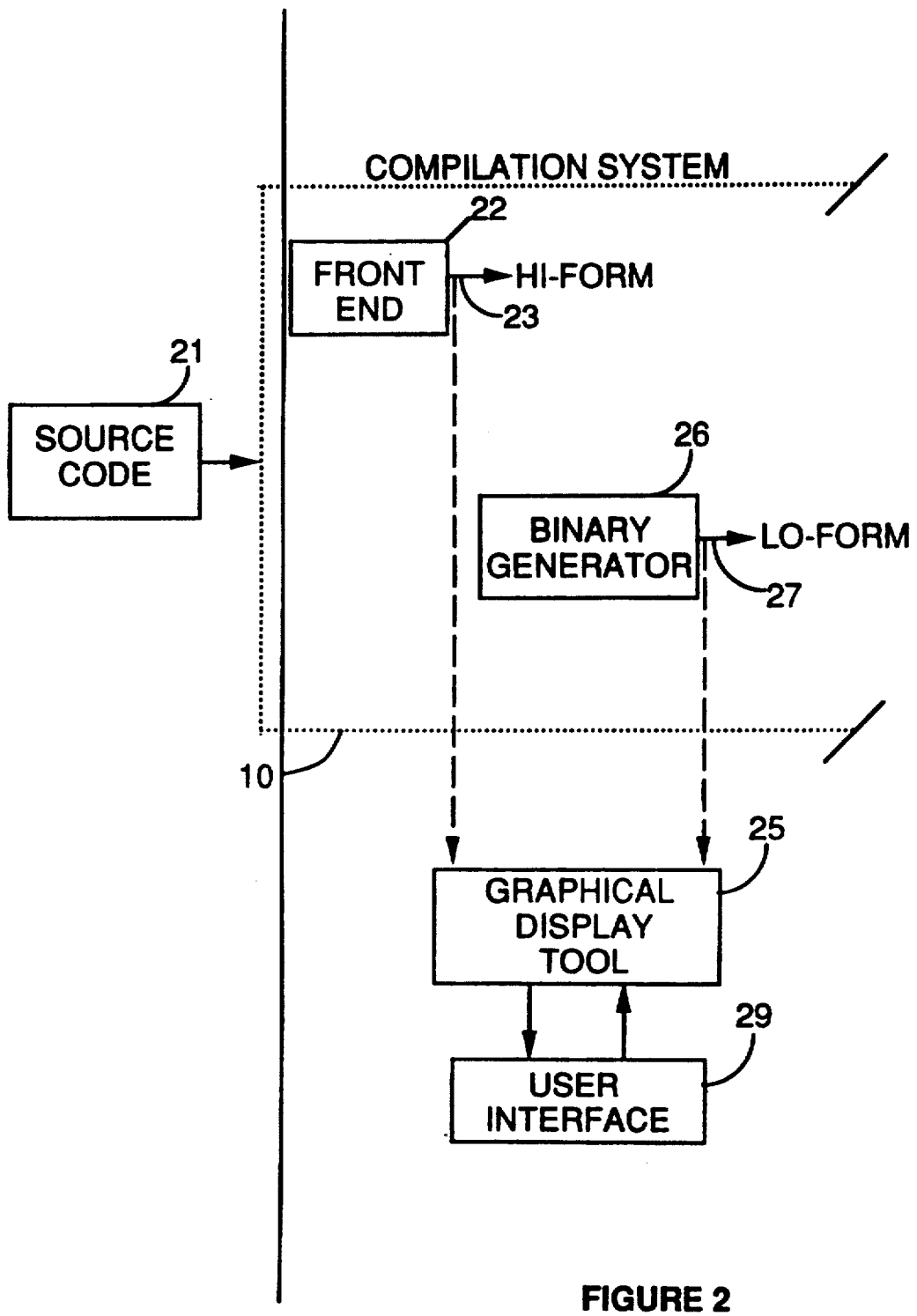
FIG. 2 is a schematic diagram showing the relationship of the graphical display tool to the compilation system.

FIG. 2, is a schematic diagram of the graphical display tool of the preferred embodiment and its relationship to two elements of the compilation system. The source code 21 of the program enters the compilation system 10 through a front end 22. The front end generates the HF level 23 of the intermediate database representation used by the compilation system 10. Later in the compilation process, the binary generator 26 generates the LF level 27 of the intermediate database representation used by the compilation system 10. The graphical display tool program 25 accesses the HF representation 23 of information in response to user requests via the user interface 29. The graphical display tool program 25 also accesses the LF representation 27 of information in response to user requests via the user interface 29.

Figure 3:
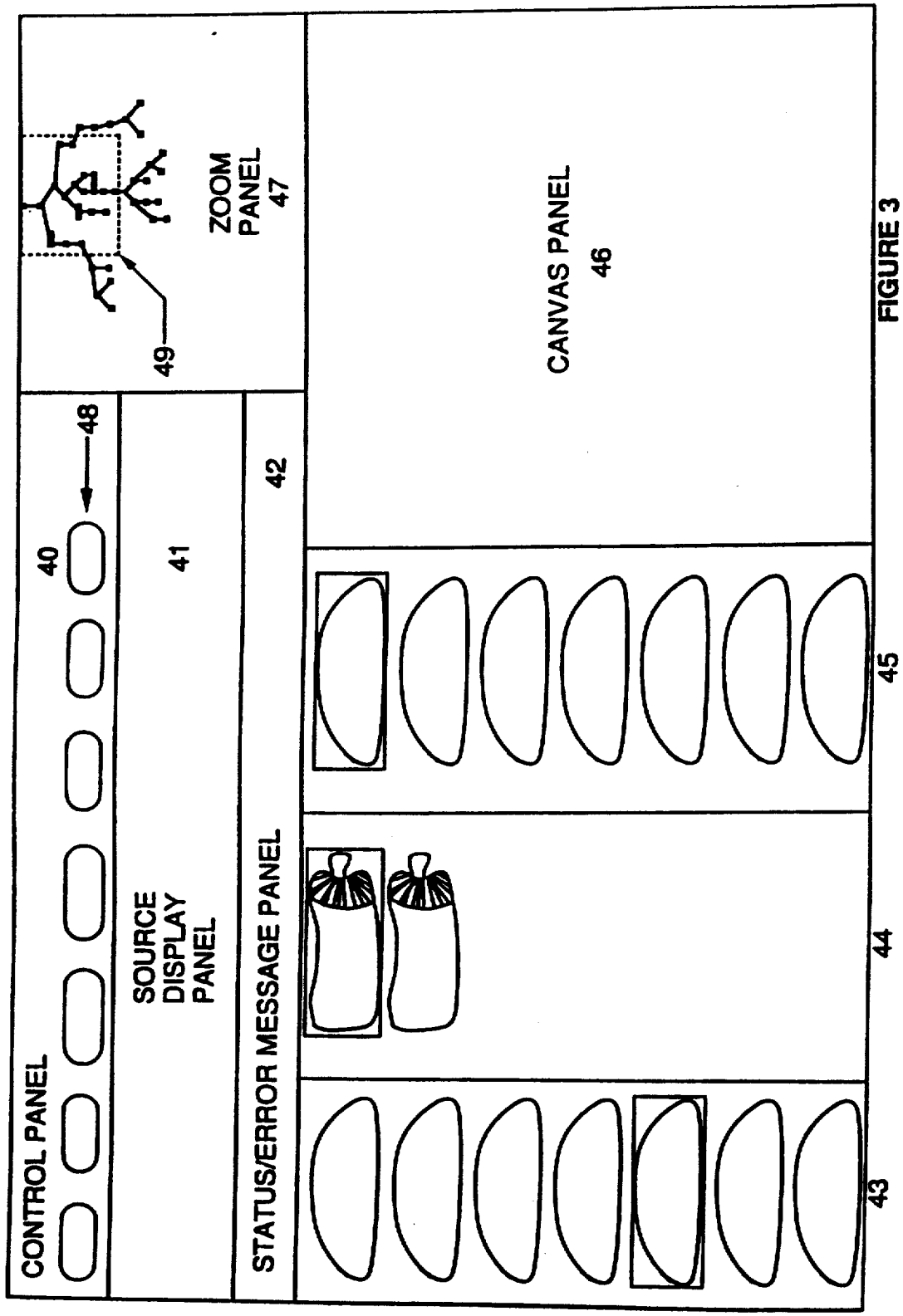
FIG. 3 shows a general display format of a possible visual presentation to the user to enable the user to interface to the graphical display tool of the present invention.
Figure 4A:
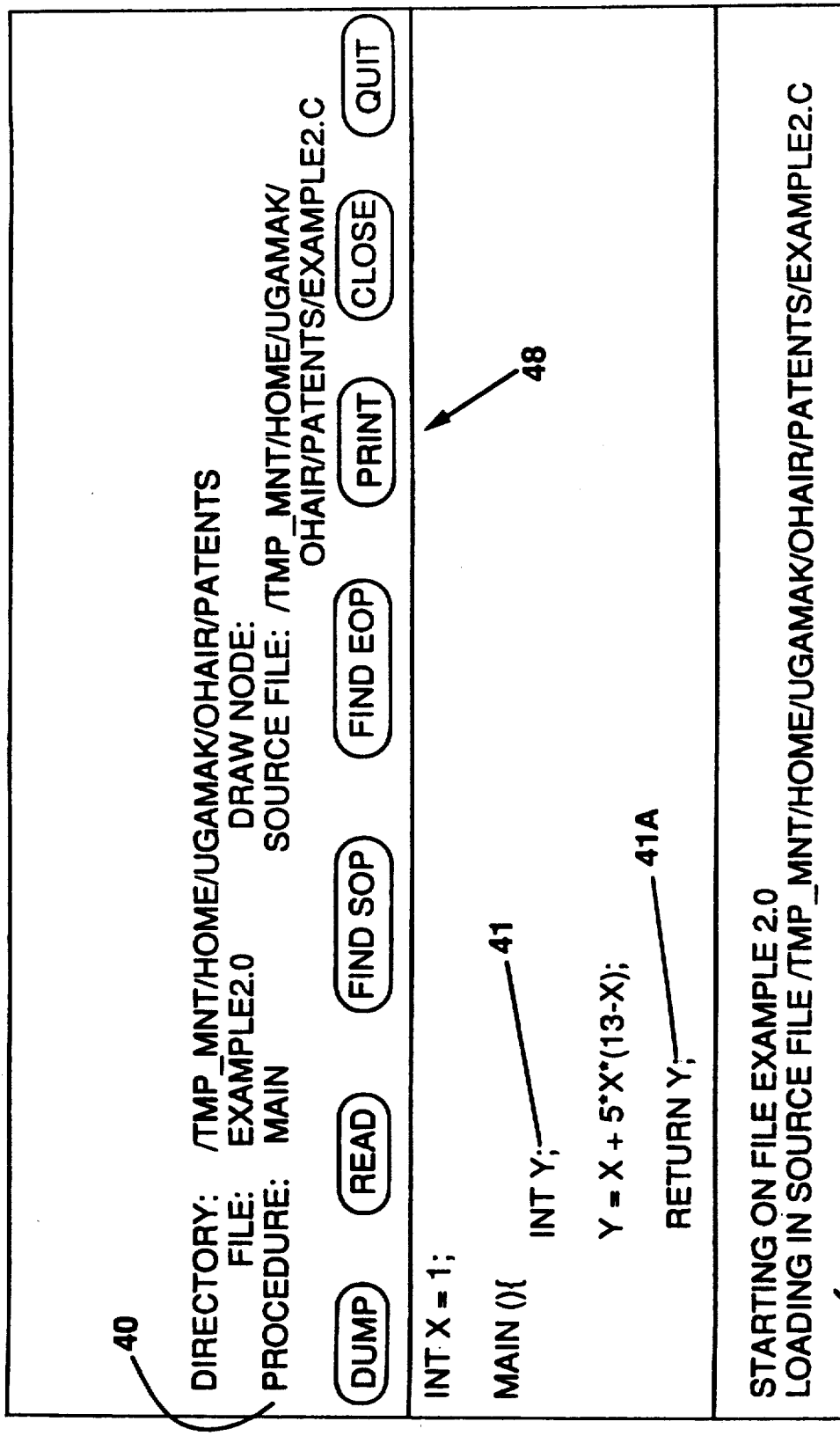
FIGS. 4A-4C are expanded portions of a typical display generally in accordance with FIG. 3.

FIG. 3 shows one implementation of a possible user interface to the graphical display tool of the present invention. Note that this description uses terms "pane" and "panel" interchangeably throughout. The basic display is a window divided into panes each containing a specific type of information. The function of each of the panes is described in FIG. 3. The control buttons 48 are software established and controlled. The mouse (not shown) is used to position the cursor over a drawing of a button on the screen, and one of the mouse buttons is then depressed. FIG. 4A shows the Control Panel 40, the Source Display Panel 41, and the status/error message panel in detail. The FIND SOP button in 40 of FIG. 4A is used to locate a statement given a specific location in the source file. The user points at a particular character in that source file window and asks to see the HF statement that maps to that source file location. The FIND EOP button in 40 of FIG. 4A works exactly like the FIND SOP button except that it locates a particular expression tree instead of a statement.

The control pane 40 in FIG. 4A provides the file and directory names for the program being compiled and contains various control buttons 48 used to manipulate the display and the display tool program. Control buttons 48 in FIG. 4A can request the standard textual dump of the complete intermediate (DUMP), display a particular item by name or index, search the intermediate for a particular item that matches a source location (FIND), select a particular directory and file to read (READ), request a full or partial screen printout (PRINT), select a particular procedure in the intermediate, close the tool program to an icon (CLOSE), and quit the program (QUIT).

The source display pane 41 in FIG. 4A shows the source code currently being acted upon. This is the source of the intermediate representation that is the object of the current display, and can contain any available language such as C, Fortran, or assembly. An insertion point 41a in FIG. 4A in this pane indicates where in the source the current statement being examined resides. In this example, the current statement is a RETURN, and this is highlighted 43a in FIG. 4B in statement pane 43. The user can combine use of the insertion point, a mouse (as available), and control buttons 48 to search between the source and the intermediate representation.

The status and error message pane 42 in FIG. 4A shows the utility or activity invoked from the graphical display tool and also presents error messages. The statement chain pane 43 in FIG. 4B lists the intermediate representation statement chain which represents the control flow. The user can select a statement to examine. The currently selected statement 43a is typically displayed as highlighted which is represented in FIG. 4A with a black surround. The basic block pane 44 displays the chain of current basic blocks. The highlighted basic block 44a shows the location of the selected current statement 43a. Basic blocks are groupings of statements that are executable without interruption. The machine instruction pane 45 in FIG. 4B lists the machine instructions generated for the currently selected statement 43a.

Canvas panes 46 and 47 (FIG. 3) show the expression tree within the expression statement highlighted in pane 43. Canvas pane 47 shows the overall schematic structure of the expression tree that exists within the statement highlighted in pane 43. A rectangular box 49 is used as a zoom finder to specify a portion of the tree schematically represented in pane 47 which is enlarged in canvas pane 46. Canvas pane 46 is used to display expression trees, directed acyclical graphics, and, as requested, machine instructions. A variety of icons differentiate between nodes of the expression such as types of nodes, types of expressions, literals, variables, and so forth. Each of these expression tree nodes contains textual information that the user can elect to view. The expression tree appearing in pane 46 is the expression within highlighted statement 43a in 43 of FIG. 4B. The tree for this particular statement is illustrated in FIG. 4C.

Figure 4B:
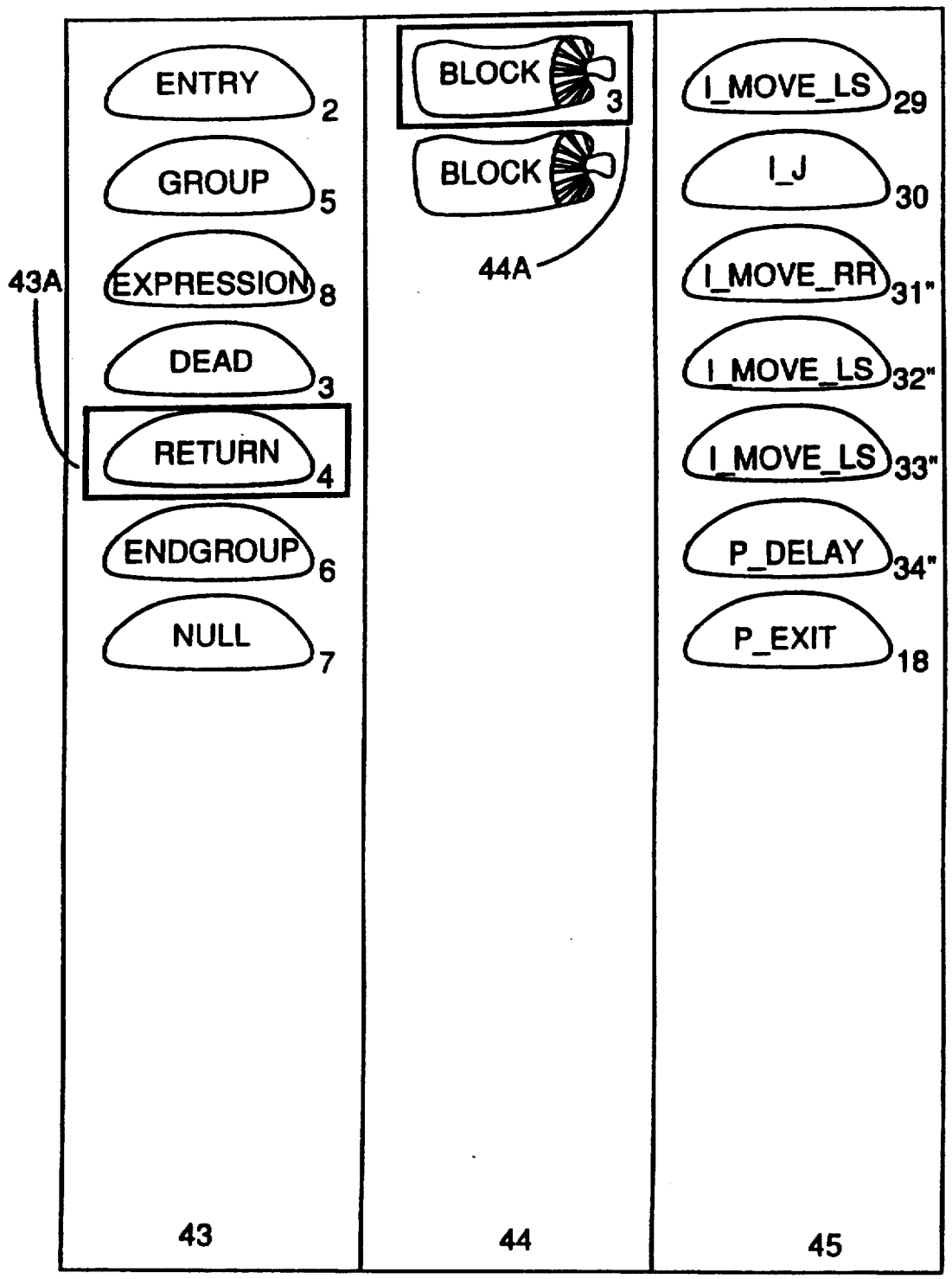
Figure 4C:
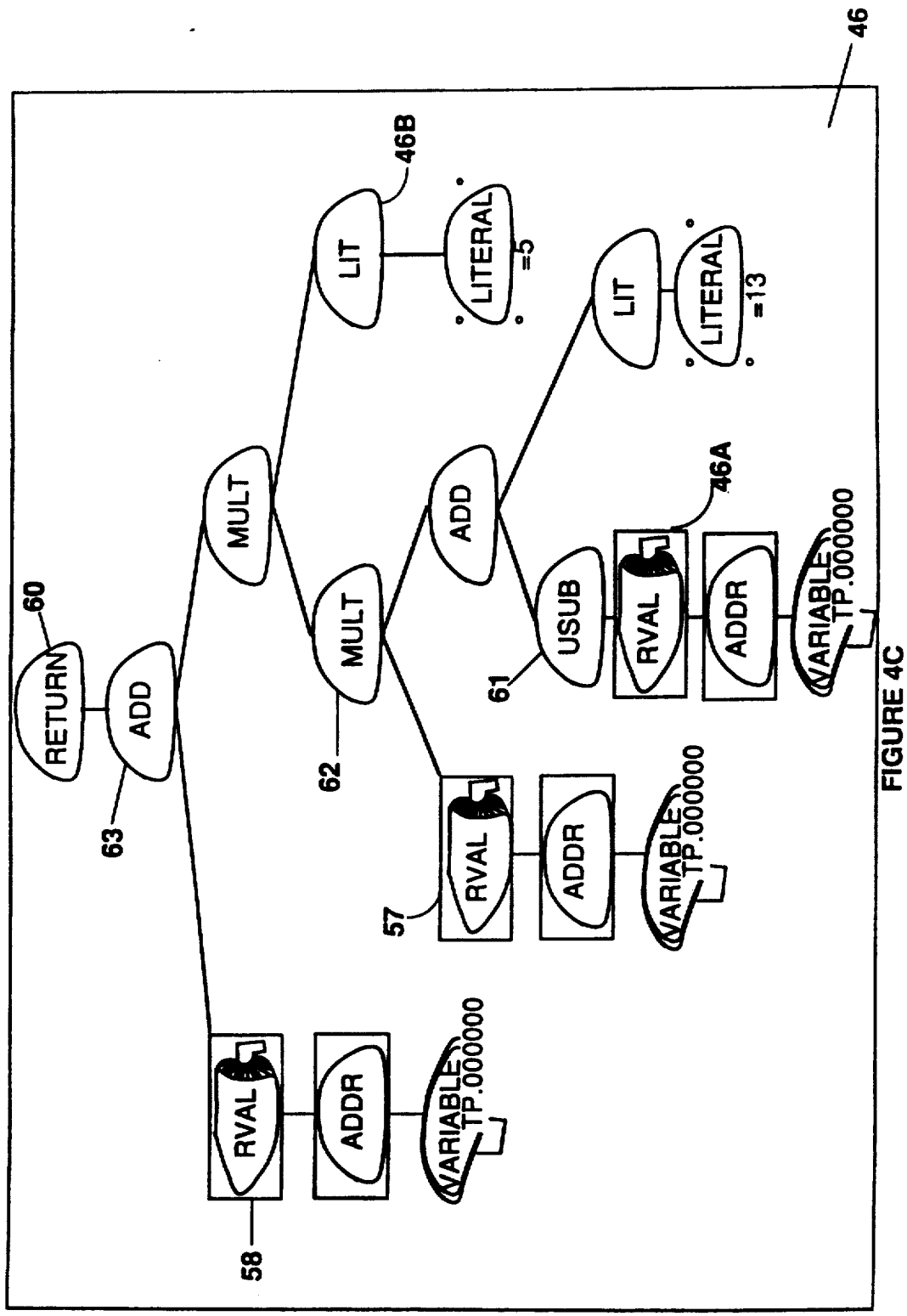

Note in the example of FIG. 4C that DAG is displayed. In this case, nodes 46A, 57 and 58 are all children nodes. That is, they are all identical except each depends from a different parent, namely nodes 61, 62 and 63, respectively. This is why they are presented on the FIG. 4C display as highlighted elements (i.e.: with a surrounding box or border) as is the case for each node connected subsequently thereto in the DAG tree. In the intermediate as it exists, the nodes 46A, 57 and 58 are actually a single, common RVAL node with one ADDR and one VARIABLE node subsequently connected thereto seriatim.

Also note that the RETURN node 43A of FIG. 4B is a statement node whereas the RETURN node 60 is an expression node. Node 43A has a mapping to the original source language in panel 41 as the "return y" statement. The expression node 60 maps to the "y=" expression in source code panel 41.

The user can place the cursor over any element shown in panel 46 and the system automatically replaces the return node 60 with the newly selected node and the other nodes connected to it as descendents. The highlighting of the other elements in the display is likewise appropriately shifted.

It is also possible to obtain the FIG. 4C display by positioning the mouse controlled cursor in control panel 40 and entering "EX 19" for RETURN expression number 19. VARIABLE 19 is represented by a different mushroom-like outline since it differs from the expression 19 and is located in a symbol table. That is, RETURN expression 19 is the nineteenth element of the expression table. In fact, different symbol configurations as used in the displays presented in FIGS. 3, 4B and 4C each represent a different class of element associated with the intermediate.

When a different statement listed in statement pane 43 of FIG. 4B is selected by the user, all the panes in the window change immediately to reflect the new user selection. In this way, the graphics tool displays related pieces of information without requiring the user to find the relationships. Also, the program automatically maintains the hierarchy of information presented to the user. Canvas panes 46 and 47 constantly provide information on hierarchy within expression trees, panes 43 and 44 constantly provide information on hierarchy within statement chains and building blocks.

Figure 5E:
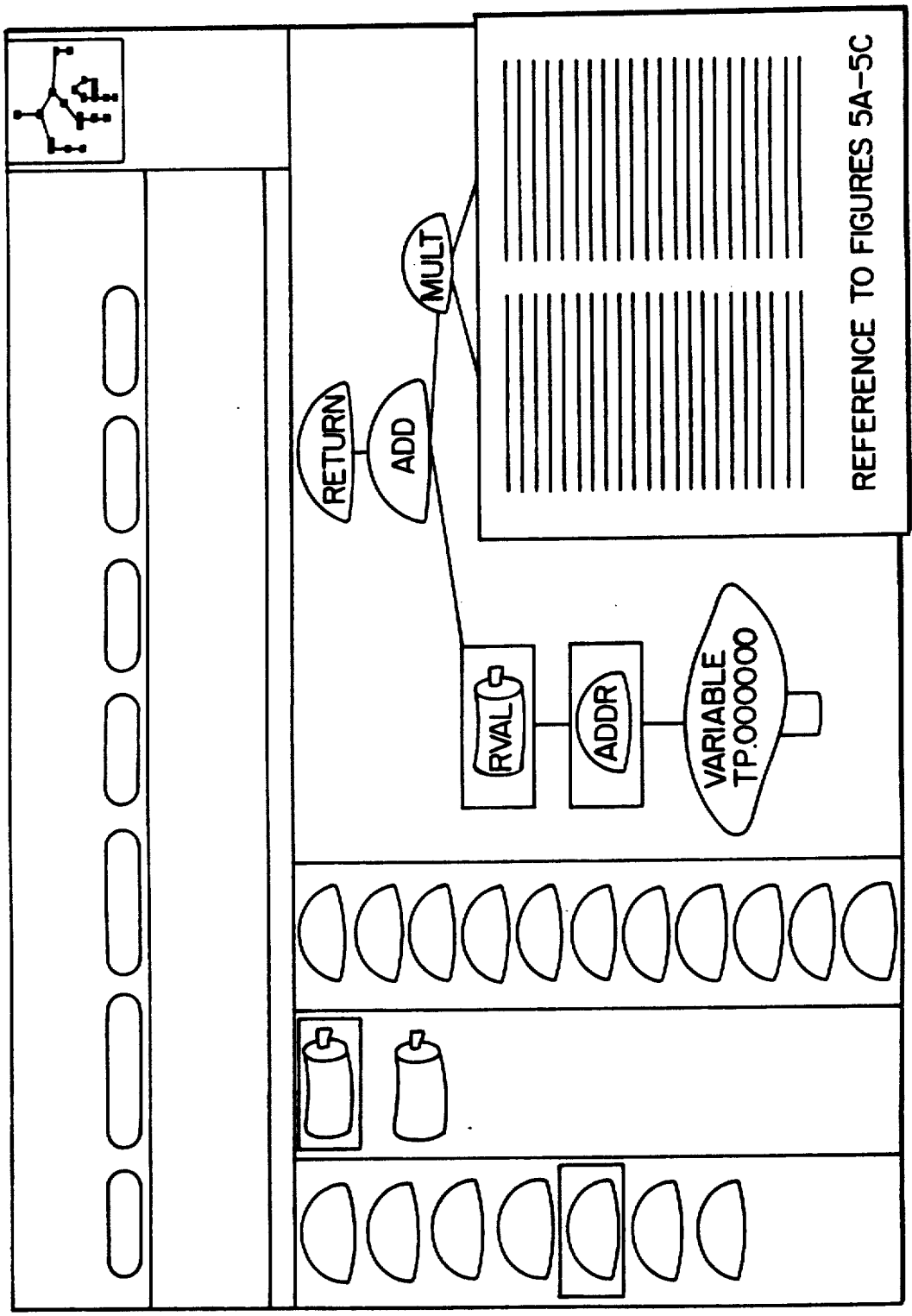
FIG. 5E is a display format similar to FIG. 3 but illustrating a typical location for overlay segments pursuant to FIGS. 5A, 5B and 5C.
Figure 5F:
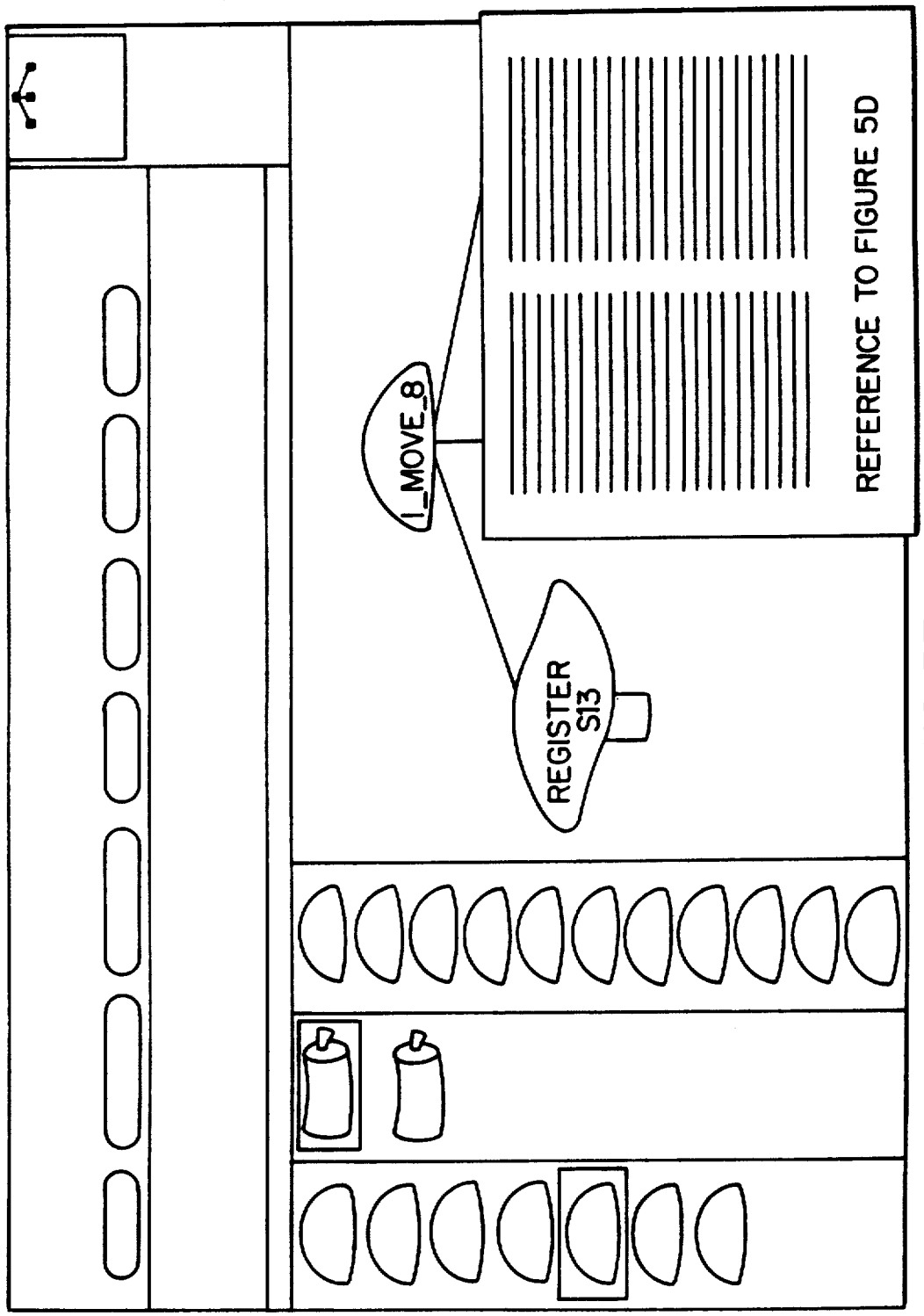
FIG. 5F is a display format associated with FIG. 5D including an indication of the positioning of the FIG. 5D panel.

A particular icon item on the screen (statement, basic block, expression tree node) can be selected and the textual information associated with the item is displayed. Textual information is provided in the intermediate representation form. As illustrated in FIGS. 5E and 5F, the textual information is represented as a window overlay on the display screen in the manner shown in FIGS. 5A-C and FIG. 5D, respectively. FIG. 5A shows the intermediate representation for selected return statement 43a (see FIG. 4B) in the box or window brought to the foreground. In FIG. 5B, the intermediate representation for selected expression tree node 46a (the RVAL node, see FIG. 4C) is shown in the box brought to the foreground.

In FIG. 5C, the intermediate representation for the basic block node 44a (see FIG. 4B) is shown in the box brought to the foreground. FIG. 5D shows the result of requesting the LF machine code for an expression node 46b (see FIG. 4C). That is, the intermediate representation for the LF node associated with 46b is shown in the box brought to the foreground.

Although the elements associated with the intermediate are in binary form, the code to convert them to the visually intelligible form such as that shown in FIGS. 5A-5D is resident in either the compiler itself, the graphic display program, or both. This is a conventional data processing conversion procedure.

The initial display presented to the user by the graphic display tool program is configured pursuant to FIG. 3. However, all of the panels appear blank except for control buttons 48 on control panel 40. The user enters into panel 40 the identification of a compiled or partially compiled program for which the user desires to inspect the intermediate representations. The user may have originally input this program as a source to the compiler. The graphic display tool program (Nodestool) retrieves this intermediate and stores it within the storage area allocated to Nodestool. At the same time, Nodestool presents the display of the source and status information along the lines of panels 41 and 42 as well as the chain of statements in panel 43, and blocks in panel 44.

Typically, nothing is initially contained in panels 45, 46 or 47 although this depends upon the particular statement contained at the top of the panel 43 list. Should the initial statement of panel 43 have expressions or machine code associated therewith; Nodestool produces an appropriate tree in panels 46 and 47 along with any machine instructions for panel 45. The user places a cursor over a particular element from the source panel, the statement list or the block list of this display and actuates a first switch. Nodestool responds by tracing all of the descending expression interconnections of that element and presents it in somewhat schematic form as tree in zoom panel 47 including a canvas panel outline 49 similar to the FIG. 3 example. Canvas panel 46 presents the elements and connections contained within window 49 in considerably expanded form along the lines of FIG. 4C thereby making it possible for the user to physically inspect the structure of the intermediate representation of the source program which the user may have originally input to the compiler.

Concurrently with selection of an intermediate element as aforesaid, Nodestool displays in panel 45 a machine instruction listing associated with the selected element. The user can likewise select a descendant element in the portion of the tree contained within canvas panel 46. Nodestool immediately moves the selected element to the top position in both panels 46 and 47 while changing the machine instruction in panel 45 to reflect those associated with the then selected element.

By actuating a second switch with the cursor over an element in the display, Nodestool will retrieve that portion of the intermediate, convert it into the textual information relating to that element, and present it in an overlay window on the same display. Accordingly Nodestool responds to either or both of the switch actuations to make it possible for the user to dynamically inspect and interpret some or all of the intermediate representation created in response to the user source code input. The user can then return to the compiled program and make any adjustments or corrections desired.

Appendix A

NODESTOOL(1)  USER COMMANDS  NODESTOOL(1)

NAME nodestool — window- and mouse-based tool for displaying HF *nodes*.

SYNOPSIS nodestool [ *generic-tool-arguments* ]

xvnodestool [ *generic-tool-arguments* ]

DESCRIPTION

Nodestool is a SunView or X tool used to display the intermediate forms (HF HiForm) generated by the SS-1 module compilers. Nodestool is also available in an X version called xvnodestool. Nodestool operates off of the ELF SS1 .o files (containing HF) from the SS-1 C and Fortran compilers (cc1 and f771). HF is the HiForm intermediate language of the SS-1 module compilers and is based on *nodes*. Nodestool can display all the HF nodes: *expression-nodes, statement-nodes, block-nodes, lf-nodes, symbol-nodes, dependence-nodes, type-nodes*, and *literal-nodes*. To get HF into the ELF SS1 .o file you should use the -N compiler option. If you wish to also view the *block-nodes* created by the *optimizer* of the compilers you will need to also use the -Olevel compiler option ( *level* equals 1, 2, 3, ...).. The original source used to generate the HF is also displayed and the mappings from HF to source and source to HF are used to keep a text insertion pointer up-to-date in the source window.

OPTIONS

*generic-tool-arguments*
  See the suntools man page under *Generic Tool Arguments*

USAGE

An example of using the compiler to generate a ELF SS1 .o file follows:
  cc1 -N -O2 test.c
Then start up nodestool:
  nodestool &

Nodestool consists of a Panel window, a Source Text Window, a Message Text Window, a Locator Canvas Window, a Expression Tree Canvas Window, a Statement Chain Canvas Window, a Block Chain Canvas Window, and a LF Chain Canvas Window. The Panel Window provides the various function buttons needed. The Message Text Window provides informative messages and error messages. The Source Text Window is used to display the original source text of the program. Each of the canvas windows are used to display different types of HF *nodes*. All the Canvas Windows are kept in up-to-date relative to the contents of all the other windows, i.e. if the user asks for an *expression-node* to be drawn the associated *statement-node* chain, *block-node* chain, and *lf-node* chain will be drawn for that *expression-node*. The HF connections provide the following mappings: *lf->expression, expression->lf, statement->lfchain, statement->blockchain, block->statement, expression->statement, statement->expression, statement->source,* and *expression->source*. Using these mappings as any kind of node is selected the appropriate paths are use to update the other Canvas Windows. Details on these various windows follow:

Panel Window

This window is a panel consisting of many panel buttons and several panel text items. For all the panel buttons the left mouse button should be used to depress or push that button. In all cases the mouse must be located over the appropriate button.

Directory:

This is actually a panel button followed by a panel text item. The button (the word "Directory:") provides a mechanism to change the current directory by holding down the right mouse button and selecting a new directory. The "." directory will cause the current directory to be re examined, the ".." directory will back you up one. The text displayed is the actual directory name text which can be edited by positioning the mouse on the name, clicking the left mouse button, and typing in the directory name (use the delete key to delete characters). Hitting return causes this directory to be selected and examined. The File: panel item gets updated when the directory changes. The text item will be kept in sync with the button choice and visa versa. Only files containing HF will be listed in the File: pulldown menu.

File: This is also a panel button followed by a panel text item. The button (the word "File:") provides a mechanism to select a file that contains HF in the current directory. By holding down the right mouse button you can select one of the file in the default menu (all files containing HF and in the current directory will be listed in this panel choice item). The text displayed is the actual file name text which can be edited by positioning the mouse on the name, clicking the left mouse button, and typing in the file name (use the delete key to delete characters). Hitting return causes nodestool to verify that it exists. The text item will be kept in sync with the button choice and visa versa. Selecting a file does not cause it to be read, only verified for it's existence. Use the Read button to actually read in the HF from the selected file.

HF_for::

Contains a list of all the procedures in all the HF defined in the current file. You can type in a name here or select from the menu. This menu item will automatically update as a particular HF is read in. Operates just like "File:".

Proc: Contains a list of all the procedures defined in the current HF and connected to the scope_root. You can type in a name here or select from the menu. This menu item will automatically update as you enter procedure definitions. Operates just like "File:".

Draw Node:

If there is a particular indexed *node* of interest it can be typed into this panel text item. Hitting return causes nodestool to display the *node* of interest. The format of this text is an optional alphabetic string followed by a decimal number, e.g. "sym 2", "st 33", "ex44", or "55". If no alphabetic name preceeds the number it is assumed to be a *expression-node*. This will work on type nodes, loop nodes, block nodes, darc nodes, literal nodes, symbol nodes, dude nodes, ... just about any kind of node. Selecting a type node will cause a type graph of that type to be drawn. Selecting a block or loop node will cause a structure graph starting at that location to be drawn.

Read After selecting a file this button should be used to read in the HF tables from the selected file. If the file contains several sets of HF tables (i.e. Fortran files containing more than one routine generate files with multiple sets of HF tables) each use of Read will read in a new set of tables from the file in a circular fashion (after reading in the last set, you start over again with the first set).

Dump  This button is used to get an ASCII dump of the HF tables that are currently in memory and active (the HF read in with the last use of the Read button). The ASCII dump will appear in a scrollable pop-up text window to the right of the Panel Window. The Dump button is a toggle button and hitting it again will close down the pop-up dump window. Once the ASCII dump is generated (the first use of Dump ) it is saved so that toggling the button back and forth does not cause regeneration of this ASCII dump. The dump file is a temporary file generated using the tmpnam() function.

Find EOP

Using the current HF tables and the current insertion point in the Source Text Window this panel button causes a search of all the *expression-nodes* looking for a match to this source location. Assignments have highest priority and literals have lowest priority. Once an *expression-node* is found it is used to refresh all the Canvas Windows. The source address of expressions are typically the first character of the operator or operand.

Find SOP

Using the current HF tables and the current insertion point in the Source Text Window this panel button causes a search of all the *statement-nodes* looking for a match to this source location. Once an *statement-node* is found it is used to refresh all the Canvas Windows. The source address of statements are typically the first character of the keyword or the first character of the line on which the keyword is on.

Print  Use this button to print out the image on the screen.

Close  Use this button to close down nodestool to the iconic state.

Quit  Use this button to quit nodestool. A pop-up confirmation window will appear to confirm the request to quit.

Source File:

This will show the name of the current source file being displayed. It will automatically update itself. You cannot select a source file.

Source Text Window

This window is used to display the actual source that was used to create this HF. No checks are made to verify that the source file is older than the ELF SS1 .o file. The name of the source file is obtained from the module *symbol-node* from the first module *scope-node* in the HF tables. The insertion point (the little black diamond) is what represents the current source file address (the character that follows it is the actual location). This text insertion point is what is sampled by the Find EOP and Find SOP panel buttons described above. When a *statement-node* is selected (or highlighted) the text insertion point is moved to the location stored in the HF for that statement. Similarly for the *expression-nodes*. To use the Find EOP and Find SOP panel buttons the user must set this insertion point using the left mouse button. Note that the insertion point is what is sampled, not the highlighted text.

Message Text Window

This window will contain any error messages generated and also any informative messages that nodestool decides to tell you. Error messages also generate annoying beeps and flashes.

The Canvas Windows all operate in a similar manner when it comes to the left and right mouse buttons. The left mouse button causes this *node* to become the current selected *node* of interest (and to be highlighted). The right mouse button IF KEPT DEPRESSED over a *node* will cause a pop-up window to appear containing detailed *node* information on the selected node including if appropriate a *type-node* dump. If when you release the right mouse button the cursor is inside the pop-up window, the pop-up window will persist, otherwise the pop-up window will disappear. To remove the pop-up window (if it persists after releasing the right button) just depress the right mouse button anywhere outside the pop-up window.

Locator Canvas Window

Use the left mouse button to locate the box in this window which selects the area of interest to see in the Expression Tree Canvas Window. Use of this "windowing" style of scrolling is only needed on very complex trees.

Expression Tree Canvas Window

This window is used to display the current *expression-node* in tree form. Repeated *expression-*

*nodes* in the tree are drawn repeatedly. Clicking the middle mouse button on an *expression-node* or *If-node* will cause the appropriate *If-node* or *expression-node* to be drawn. Expression nodes that are dags (used more than once in the HF) will have highlighted edges. RVALUE and LVALUE expression nodes will be drawn differently and the associated dude node will be draw next to them. Vector expression nodes will also be drawn differently.

Statement Chain Canvas Window

This window displays a chain of *statement-nodes* starting with the beginning of a procedure or the last *statement-node* selected. This depends on the situation. Inlined statement nodes are displayed with a black stem and darker outline. These are poison mushrooms, so watch out, they may kill you.

Block Chain Canvas Window

This window displays a chain of *block-nodes* starting with the *block-node* attached to the current selected *statement-node*.

LF Chain Canvas Window

This window displays a chain of *If-nodes* starting with the *If-node* attached to the current *statement-node*.

FILES

Temporary files needed by nodestool are generated using tmpnam() and should be invisible to the user.

All files related to building nodestool are located at /prod/nodestool/v00.04/sun3/src.

BUGS

It needs lots of swap space. It might be a better idea to quit nodestool instead of leaving it around in an iconic state. It could use up alot of swap space and may grow larger and larger over time.

If the HF nodes are bad, or you ask for a node that is beyond the table size for that node, then nodestool may die with a Bus error or segmentation fault. Some checks are made on the range of node index values, but the nodes are run through the HF macro set which do no checking and who knows what might happen.

You cannot quit with the base_frame pull down menu, you must open up nodestool and hit the Quit button.

The size of the base frame of nodestool cannot change once the tool is started, however the *generic-tool-arguments* (sunview or X -W options) can be used to determine the starting size for the tool.

The interface to nodestool may change from time to time, you may have to poke around and do a little MAC-like learning. The ultimate answer to "can I do this?" is to try it, your answer will be obvious.

The X version of nodestool ( xvnodestool ) differs from the SunView version in many ways: the File: and Directory: menus are different, but work in a similar way, the pop up windows with the node info text are much nicer now, (you click the middle mouse button only once, you can have any number of them, and pulling out the pushpins removes them), and the Dump window also has a pushpin that can be pulled out use it to remove the Dump window (push the Dump: button to bring it up again).

While the exemplary preferred embodiments of the present invention are described herein with particularity, those having normal skill in the art will recognize various changes, modifications, additions and applications other than those specifically mentioned herein without departing from the spirit of this invention.

What is claimed is:

1. In a data processing system including a control unit operable in conjunction with a visual display device and a memory means for storing data and programs, a method of graphically displaying on said display device the intermediate representations of the result present in said memory means as generated by a compiler program in producing a machine code program implementation from a source code input with said compiler program establishing connections and indices for the elements of said intermediate representations and wherein a user selects a particular intermediate element for visual inspection comprising the steps of:

identifying the set of connections and indices correlating said selected intermediate element with other intermediate elements, retrieving said set of intermediate representations from the memory means through utilization of said identified connections and indices, and displaying said set of intermediate representations on the display device in conjunction with said identified connections and indices from said collecting step.

2. The method in accordance with claim 1 wherein said displaying step includes the step of presenting a visual tree pattern having said particular intermediate element at the base thereof and having at least a portion of said set of intermediate representations connected in accordance with their relationships from said identifying step.

3. In a data processing system including a control unit operable in conjunction with a visual display device and a memory means for storing data and programs, a method of graphically displaying on said display device the intermediate representations of the result present in said memory means as generated by a compiler program in producing a machine code program implementation from a source program input wherein the compiler functioned to establish interconnecting references between a plurality of intermediate representation elements comprising the steps of:
 presenting on the display device a visual display having a plurality of panel areas defined thereon,
 listing a chain of said intermediate representation elements in a first of said panel areas,
 producing a signal identifying a particular intermediate representation element, and
 responding to a said signal producing step by retrieving said particular element and all elements interconnected therewith from the memory means for display in a second of said panel areas.

4. The process in accordance with claim 3 wherein said responding step includes the step of converting said elements into textually descriptive information for said second panel area display.

5. The process in accordance with claim 3 wherein said responding step includes the step of forming a schematic tree of the interconnections between said particular element and its said interconnected elements for presentation in a third said panel area, said second panel area having an expanded presentation of said particular element and only those said interconnected elements which are expandable to contain visually usable label information associated therewith.

6. The process in accordance with claim 3 wherein said responding step includes the step of retrieving all machine instructions established in conjunction with said particular element for presentation in a fourth of said panel areas.

7. The process in accordance with claim 3 wherein said responding step includes:
 the step of responding to a first selection signal by converting said elements into textually descriptive information for said second panel area display, and
 the step of responding to a second selection signal by forming a schematic tree of the interconnections between said particular element and its said interconnected elements for presentation in a third said panel area concurrently with said second panel area having an expanded presentation of said particular element and only those said interconnected elements which are expandable to contain visually usable label information associated therewith.

8. The process in accordance with claim 3 which includes the steps of:
 designating one of said panel areas as a control panel,
 dividing said control panel into a plurality of sub-areas,
 establishing specific intermediate representation manipulation operations for respective said sub-areas, and
 providing means for user selection of one of said sub-areas.

9. The process in accordance with claim 3 which includes the steps of:
 presenting said source program in another of said panel areas, and
 highlighting said selected element in the particular said panel area in which it appears along with any display items in other said display areas where said items are directly related to said selected element.

10. In a data processing system having a visually observable display, a user operable device for selecting discrete locations on said display, and means for storing programs including a compiler that accepts a source program input and creates a machine usable program of machine instructions therefrom by establishing an intermediate representation composed of elements including statements, blocks of statements, and expressions wherein said elements are interconnected, the process of presenting the intermediate representation for visual observation comprising the steps of:
 dividing said display into plurality of panel areas,
 presenting a chain of said statements in a first of said panel area,
 retrieving an intermediate representation element in response to operation of said selecting device, and
 creating a tree in a second of said panel areas depicting the interconnection of the retrieved said element with other said elements and having the selected said element as the root for said tree.

11. The process in accordance with claim 10 wherein said tree creating step includes the step of presenting the schematic representation of said tree in a third of said panel areas with said second panel area containing an expanded version of a portion of schematic tree.

12. The process in accordance with claim 11 which includes the steps of presenting a chain of said statement blocks in a fourth of said panel areas and a listing of any machine instructions compiled for a selected said element.

13. The process in accordance with claim 12 which includes the step of presenting the source program in a fifth said panel area.

14. The process in accordance with claim 13 which includes the step of highlighting the selected said element and all other elements which are associated directly therewith but are contained in others of said display area.

15. The process in accordance with claim 13 wherein the user selection device is capable of producing a second selection signal in conjunction with an intermediate representation element, the process including the step of responding to said second selection signal by compiling textual information associated with said second element, and
 establishing a window on said display for presenting said textual information.

16. The process in accordance with claim 15 wherein said window establishing step includes the step of overlying said window on at least one of said panel areas.

* * * * *